(12) United States Patent
Rist

(10) Patent No.: US 6,283,169 B1
(45) Date of Patent: Sep. 4, 2001

(54) APPARATUS FOR THE WINDING OF COILS

(76) Inventor: Otto Rist, Baindrer Strasse 25, D-88255 Baienfurt (DE)

( * ) Notice: Subject to any disclaimer, the term of this patent is extended or adjusted under 35 U.S.C. 154(b) by 0 days.

(21) Appl. No.: 09/323,888

(22) Filed: Jun. 2, 1999

(30) Foreign Application Priority Data

Jun. 2, 1998 (DE) .................................................. 19 24 327

(51) Int. Cl.$^7$ ...................................................... B21F 3/00
(52) U.S. Cl. ............................................................. 140/92.1
(58) Field of Search ............................................. 140/92.1

(56) References Cited

U.S. PATENT DOCUMENTS

| 3,065,771 | * 11/1962 | Possis et al. | 140/92.1 |
| 3,980,243 | 9/1976 | Schulman | 242/7.05 B |
| 4,751,946 | 6/1988 | Eminger . | |
| 5,265,814 | * 11/1993 | Stralka | 57/294 |

FOREIGN PATENT DOCUMENTS

| 24 34 480 | 1/1976 | (DE) . |
| 0 741 442 | 11/1996 | (EP) . |

OTHER PUBLICATIONS

Hiroyuki, "Patent Abstracts of Japan", Pub. No. 59230451, Pub. Date Dec. 12, 1984.

* cited by examiner

*Primary Examiner*—Lowell A. Larson
(74) *Attorney, Agent, or Firm*—Crowell & Moring, L.L.P.

(57) ABSTRACT

An apparatus (1) for the winding of coils or coil groups is proposed, in which apparatus (1) winding may be carried out with different wires (5, 19) at little cost. This is achieved according to the invention in that, in addition to a first so-called flyer (2) having a corresponding wire guide (4), a second flyer (15) and a second wire guide (17) separate from the first wire guide (4) are provided.

15 Claims, 1 Drawing Sheet

APPARATUS FOR THE WINDING OF COILS

Figure 1:
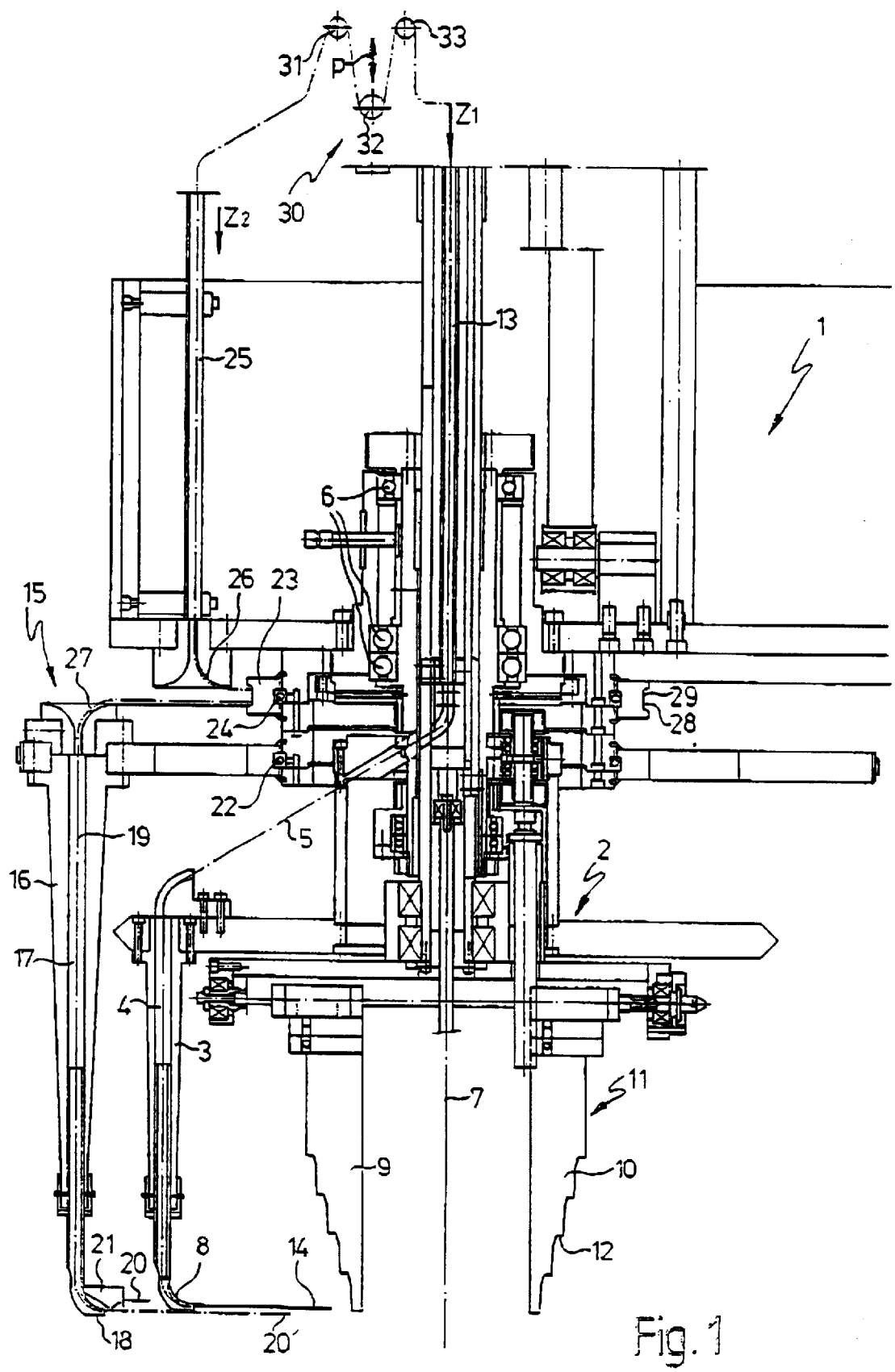

The invention relates to an apparatus for the winding of coils or coil groups, in particular for stators of electric motors.

Coils or coil groups for stators of electric motors are normally wound around winding templates by means of a so-called flyer and are then put down in a draw-in tool for drawing the coils or coil groups into a stator core assembly. As a rule, such a flyer consists of a rotating arm having a wire guide for the coil wire. The wire end is held by a separate wire holder, so that the coil wire is drawn off from a wire supply during the rotation of the flyer and runs through the wire guide of the flyer during the winding.

In order to be able to produce a coil having another wire, for example having a different wire diameter or a different material compared with a coil which has already been wound, in the known apparatuses the appropriate wire has to be removed from the wire feed and a new wire has to be drawn in. The drawing-in of the wire is carried out manually and takes a certain amount of time. This results in delays in the production and thus leads to increased costs.

The object of the invention is to propose an apparatus by means of which such an expenditure is avoided.

Starting from an apparatus of the type mentioned in the introduction, this object is achieved by in which a second flyer and a second separate wire guide are provided.

A wire which is different from the first wire may be drawn into the wire guide of the second flyer. A coil with a second wire having, for example, a different diameter and/or a different material may therefore be wound at any time by means of the second flyer. The simultaneous winding of two coils with both flyers is therefore also readily conceivable. In this respect, the apparatus according to the invention offers corresponding advantages even when the same wire is used for both flyers.

Thus, in an advantageous embodiment, the second flyer is designed to be rotatable about the same geometric axis as the first flyer. The common rotary axis of the two flyers is preferably arranged centrally to the winding template, so that, during the winding of the coils, the wire is in each case drawn in at as uniform a speed as possible.

Furthermore, in an advantageous development of the invention, a winding disk is arranged in the second wire guide. Such a winding disk enables the second flyer to be arranged outside the first flyer in the radial direction with respect to the common rotary axis of the two flyers and at the same time enables the second wire guide to be arranged outside the rotary axis and outside the first wire guide.

In this case, the first wire guide is preferably arranged to run at least partly on the rotary axis of the flyers. In the region of the first flyer, the wire is deflected from this axis in the radial direction. Therefore the region which has to be kept free of other machine components for the rotation of the first wire in the first wire guide is limited to the immediate vicinity of the winding template.

The winding disk, which is arranged in the second wire guide, therefore results in the advantage of arranging the second wire guide continuously outside the rotary axis of the two flyers, so that the courses of the two wires cannot cross. At the same time, the rotary arms of the two flyers may be designed with a fixed radius, the first flyer having a smaller radius.

In this case, said winding disk is preferably mounted in a rotatable manner, so that it can follow a pull of the wound-on wire by means of a rotation.

During the rotation of the second flyer, a supply winding is therefore always put onto the winding disk. In this case, there are various means of operating the second flyer during the winding of coils. Thus the wire, as in the case of the conventional apparatuses or the first flyer, may be fixed by a separate wire holder, while the second flyer rotates. In the process, a coil is wound on the winding template, while at the same time a corresponding supply winding is put on the winding disk in the second wire guide.

To unwind this supply winding, the direction of rotation of the second flyer may be reversed. This means that, for one of the following coils, the wire is first of all unwound from the winding disk. The reversal of the direction of rotation of the second flyer should be effected at a moment at which the receiving capacity of the winding disk is not exceeded.

A further means of operating the second flyer consists in attaching a supply winding having a defined number of turns to the winding disk before a coil is wound. This may be effected by a wire holder being provided at the rotary arm of the second flyer. Once the supply winding having the predetermined length has been put onto the winding disk, the desired coil, with the direction of rotation of the second flyer reversed, may then be wound in the conventional manner by the wire end being transferred from the wire holder of the second flyer to a separate wire holder and by the flyer winding a coil onto the winding template in the usual manner.

Since the winding disk has a fixed circumference, but the winding template may have different coil circumferences in order to produce coils of different size, the wire length which is wound around the winding disk with a certain number of turns is not always identical to the wire length which is required for the same number of turns for winding a coil on the winding template. If the circumference of the winding disk is smaller than that of the winding template, a factor which corresponds to a greater number of turns, this is compensated for by a winding disk rotating in the opposite direction to the second flyer, so that the requisite wire quantity is subsequently delivered without problem.

However, if the circumference of the winding disk is larger than the circumference of the winding template and/or of the coil to be wound, length compensation may be effected by the winding disk being rotated in the same direction of rotation as the flyer, the excess wire quantity being delivered again to the wire guide. To this end, appropriate means for drawing in the wire against the feed direction are advantageously provided. These means for drawing in the wire may be realized, for example, by means of compensating rollers, around which the wire is put in a serpentine manner, at least one of these rollers being movable against a restoring force.

An exemplary embodiment of the invention is shown in the drawing and is explained in more detail below with reference to the single figure, which shows a schematic cross section through an apparatus according to the invention.

The apparatus 1 comprises a first flyer 2, the rotary arm 3 of which comprises a wire guide 4 for a first wire 5. The rotary arm 3 is mounted via radial bearings 6 such that it can rotate about a rotary axis 7.

At the outlet 8 of the wire 5, the wire guide 4 is bent toward the axis 7, so that the wire 5 is led to a winding template 11 consisting of two parts 9, 10. The winding template 11 has different steps 12 for the winding of coils having a different circumference.

The wire 5 is guided above the first flyer 2 in an axial guide 13, which lies on the rotary axis 7.

The first flyer 2 functions in the known manner, i.e. the end 14 of the wire 5 is held in a wire holder (not shown in any more detail). The rotary arm 3 is then set in rotation, so that the wire 5 is wound around the winding template 11. In the process, the wire 5 is drawn up from above in the direction of arrow $Z_1$.

A second flyer 15 having a second rotary arm 16 in turn has a wire guide 17, which is bent at the outlet 18 toward the axis 7. A second wire 19 is guided in the interior of the wire guide 17 and points with its wire end 20 toward the axis 7 and thus toward the winding template 11. The wire end 20 is fixed in an intimated wire holder 21 at the rotary arm 16. Depending on the mode of operation, the wire end 20', instead of being held by the wire holder 21, may also be held by a separate wire holder (not shown in any more detail).

The rotary arm 16 of the second flyer 15 is likewise mounted via radial bearings 22 such that it can rotate about the geometric axis 7.

Independently thereof, a winding disk 23 is likewise mounted via a radial bearing 24 such that it can rotate about the geometric axis 7.

A wire feed 25 is arranged above the winding disk 23 and is provided with an outlet 26 arched toward the winding disk 23. Accordingly, the inlet 27 of the wire guide 17 of the second flyer 15 is likewise curved toward the winding disk 23.

The winding disk 23 has a circumferential groove 28, in the root of which a wire supply winding 29 is wound.

Arranged above the wire feed 25 is a tensioning device 30, consisting of three compensating rollers 31, 32, 33. The compensating roller 32 can be displaced against a restoring force, as indicated by the double arrow P.

The mode of operation of the second flyer is as follows:

In a first operating mode, a wire supply winding 29 can be put on the winding disk 23 by means of the flyer 15. This is done by the wire end 20 being fixed in the wire holder 21 and by the rotary arm 16 rotating. In the process, the second wire 19 is drawn in through the wire feed 25 in the direction of arrow $Z_2$.

The wire end 20 may then be released from the wire holder 21. The wire end 20', which is now free, is fixed in a separate wire holder (not shown in any more detail), whereupon the flyer 15 rotates in the opposite direction of rotation. In the process, a coil is wound onto the winding template 11, while the wire supply winding 29 is unwound.

In the exemplary embodiment shown, the circumference of the winding template 11, in all steps 12, is smaller than the circumference of the winding disk 23. Therefore an excess wire length is obtained when the rotary arm 16 rotates during the winding of a coil around the winding template 11. This excess wire length is drawn off toward the top in the opposite direction to the feed direction $Z_2$, as a result of which the winding disk 23 rotates with corresponding rotary speed predetermined by the wire tension 25. In this way, the necessary length compensation for the wire 19 takes place.

In the opposite case, i.e. if the winding template 11 has a larger circumference than the winding disk 23, the winding disk 23 may in turn be driven by the drawing-in of the wire 19 in the opposite direction to the aforesaid case, i.e. may also rotate in the opposite direction to the flyer 15 and thus subsequently deliver additional wire, which is drawn in from above in the direction of arrow $Z_2$.

The wire supply winding 29 may be put on in a separate operation, as described above, but may also be put on in a second operating mode at the same time as the winding of a coil on the winding template 11.

The withdrawal of the wire 19 in the opposite direction to the arrow $Z_2$ is effected when required by means of the tensioning device 30. Accordingly, the number of compensating rollers 31, 32, 33 or the adjusting travel of displaceable compensating rollers 32 is to be adapted to the wire length to be accommodated. In this case, for graphic reasons, the tensioning device 30 is only intimated.

1 apparatus
2 first flyer
3 rotary arm
4 wire guide
5 first wire
6 radial bearing
7 rotary axis
8 outlet
9 part
10 part
11 winding template
12 step
13 axial guide
14 wire end
15 second flyer
16 rotary arm
17 wire guide
18 outlet
19 wire
20 wire end
21 wire holder
22 radial bearing
23 winding disk
24 radial bearing
25 wire feed
26 outlet
27 inlet
28 circumferential groove
29 wire supply winding
30 tensioning device
31 compensating roller
32 compensating roller
33 compensating roller

What is claimed is:

1. An apparatus for winding of coils or coil groups for stators of electric motors and generators, comprising a first rotatable flyer and a second rotatable flyer, which flyers are arranged so as to be rotatable around a winding template and have a first and a second wire guide for a first and a second wire, wherein a stationary wire feed for the second wire is arranged beside the rotation axis of the flyers, and a rotatable apparatus, around which the second wire is wound coming from the stationary second wire feed and running to the second rotatable second wire guide of the second flyer.

2. The apparatus as claimed in claim 1, wherein the second flyer (15) is rotatable about the same geometric rotary axis (7) as the first flyer (2).

3. The apparatus as claimed in claim 1, wherein the rotatable apparatus is a winding disk (23) is provided in the second wire guide (17).

4. The apparatus as claimed in claim 1, wherein the first wire guide (4) lies at least partly on a geometric rotary axis (7).

5. The apparatus as claimed in claim 1, wherein the second wire guide (17) is arranged radially outside the first wire guide (4).

6. The apparatus as claimed in claim 1, wherein means (30) for drawing in the wire against a feed direction $Z_2$ are provided at the second wire guide.

7. The apparatus as claimed in claim 1, wherein the direction of rotation of the second flyer (15) is reversible.

8. The apparatus as claimed in claim 1, wherein the rotatable apparatus is configured such that the second flyer is drivable relative to the stationary second wire feed.

9. The apparatus as claimed in claim 1, wherein the rotatable apparatus is a winding disk operable independently of the second flyer such that a wire supply winding is placeable on the winding disk by the second flyer or the winding disk is drivable on a direction opposite to the second flyer by drawing-in wire.

10. The apparatus as claimed in claim 1, wherein the rotatable apparatus is operatively associated with the second flyer, in which a feed direction of the stationary wire feed is substantially parallel to a feed direction of the rotatable second wire guide.

11. The apparatus as claimed in claim 10, wherein the rotatable apparatus is a winding disk disposed substantially parallel to the second flyer.

12. The apparatus as claimed in claim 10, wherein the rotatable apparatus is a winding disk disposed substantially perpendicular to a rotating arm of the second flyer.

13. A method of producing coils or coil groups, for stators of electric motors and generators comprising the step of using an apparatus as claimed in claim 1.

14. The method as claimed in claim 13, wherein a supply winding (29) is put on a winding disk (23) during the winding of a coil around the winding template (11).

15. The method as claimed in claim 13, wherein a supply winding (29) is wound with wire end (20) fixed in the wire holder (21) of the second flyer (15).

* * * * *